(12) United States Patent
Islam et al.

(10) Patent No.: US 8,428,566 B2
(45) Date of Patent: Apr. 23, 2013

(54) NETWORK ENTITY, METHOD AND SYSTEM FOR INVOCATION OF SUPPLEMENTARY SERVICES ACROSS DIFFERENT NETWORKS

(75) Inventors: M. Khaledul Islam, Kanata (CA); Asif Hossain, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 453 days.

(21) Appl. No.: 12/394,454

(22) Filed: Feb. 27, 2009

(65) Prior Publication Data

US 2010/0222034 A1 Sep. 2, 2010

(51) Int. Cl.
*H04M 3/42* (2006.01)
(52) U.S. Cl.
USPC ........ 455/414.1; 370/259; 370/352; 370/466; 370/467; 455/414.4; 455/432.1; 455/432.3; 455/466
(58) Field of Classification Search .................. 370/259, 370/277, 310, 328, 331; 455/414.1, 422.1, 455/425, 432.1, 432.2, 432.3, 433, 435.1, 455/435.2, 436, 466
See application file for complete search history.

(56) References Cited

U.S. PATENT DOCUMENTS

| | | | | |
|---|---|---|---|---|
| 6,920,487 B2* | 7/2005 | Sofer et al. | ..................... | 709/218 |
| 7,274,943 B2* | 9/2007 | Trossen | ..................... | 455/461 |
| 7,386,009 B2* | 6/2008 | Reddy et al. | ..................... | 370/466 |
| 7,457,638 B2* | 11/2008 | Dhillon et al. | ..................... | 455/562.1 |
| 2007/0249379 A1* | 10/2007 | Bantukul | ..................... | 455/466 |
| 2010/0144351 A1* | 6/2010 | Witzel et al. | ..................... | 455/435.2 |
| 2010/0278122 A1* | 11/2010 | Singh et al. | ..................... | 370/329 |

FOREIGN PATENT DOCUMENTS

| | | |
|---|---|---|
| EP | 0 821 507 A2 | 7/1997 |
| WO | WO 96/21983 | 7/1996 |

OTHER PUBLICATIONS

Syniverse Technologies; SCCP Gateway Service Interstandard SMS Interworking Service; www.syniverse.com; 2008.
3GPP2 X.S0034-0 Version 1; $3^{rd}$ Generation Partnership Project 2 "3Gpp2"; Apr. 25, 2005; pp. 1 to 42.
Lantto, Jorgen Institute of Electrical and Electronics Engineers: "Towards a global cellular service" 1995 Fourth IEEE International Conference on Universal Personal Communications Record. Gateway to the 21st Century. Tokyo, Nov. 6-10, 1995; [IEEE International Conference on Universal Personal Communications], New York, IEEE, US, vol. CONF. 4, Nov. 6, 1995, pp. 457-461.
Han, Yeong C. et al. "Draft Technical Report: UMTS Interworking with ANSI-41 Networks", May 7, 1999, Korea, pp. 1 to 11.

(Continued)

*Primary Examiner* — Anthony Addy
*Assistant Examiner* — Michael S Bush

(57) ABSTRACT

A network entity, method and system for providing supplementary services to a mobile device while roaming. The network entity comprises a receiver, a converter and an output. The receiver is for receiving a first message from a mobile device being provided roaming service by a first network, the first message being in a transport protocol supported by the first network and having embedded therein an invocation message based on for invocation of at least one supplementary service offered by a second network. The converter is for extracting the invocation message from the first message. The output is for sending the invocation message to the second network using a protocol used by the second network to invoke supplementary services.

17 Claims, 7 Drawing Sheets

OTHER PUBLICATIONS

3GPP2: X.S0034-0 Version 1.0 CDMA2000/GPRS Roaming; Internet citation, [Online] XP002459608, URL: http://www.3gpp2.org/public_html/specs/X.S0034-0_v1.0_050526.pdf [retrieved on Nov. 21, 2007]; pp. 1 to 42.

Rapporteur et al. "Draft Technical Report : UMTS Interworking with ANSI-41 Networks" 3GPP Draft; S1-990558, 3rd Generation Partnership Project (3PPG), Mobile Competence Centre; 650, Route Des Lucioles; F-06921 Sophia-Antipolis Cedex; France, vol. SA WG1, No. Germany 19990927, Sep. 21, 1999, pp. 1-11.

European Search Report dated Aug. 11, 2009 from corresponding European Patent Application No. 09154015.3, 9 pages.

* cited by examiner

NETWORK ENTITY, METHOD AND SYSTEM FOR INVOCATION OF SUPPLEMENTARY SERVICES ACROSS DIFFERENT NETWORKS

TECHNICAL FIELD

The present application relates to a network entity, method and system for invocation of supplementary services while a mobile device is roaming.

BACKGROUND

In the past, subscribers of a network operator could only operate within a network that uses the same radio access technologies (RAT) as their home network operator or within core networks of the same type, such as different radio access networks (RAN) that use a similar type of core network (CN) as the home network. With the introduction of multi-mode devices that support different types of RANs/CNs (e.g. RANs and CNs defined in 3GPP and 3GPP2 specifications) and inter-core network support, it is now possible to roam between networks with different RAN/CN and receive service. Roaming between a 3GPP2 network such as a cdma2000 (code division multiple access 2000) and a 3GPP network, such as a GPRS (General Packet Radio Service) network, is described in 3GPP2 X.S0034-0 (TIA-1068) "cdma2000/GPRS roaming", Version 1.0, April 2005. Such networks use different RAN and CN. Examples of RANs/CNs defined in 3GPP that use different RATs are GSM/GPRS/EDGE, UMTS/HSPA, and LTE. Examples of RANs/CNs defined in 3GPP2 that use different RATs are cdmaOne, cdma2000 1x, and cdma2000 1x EV-DO.

In the case of multi-mode EDGE/HSPA/cdma2000 (Enhanced Data Rates for GSM/High Speed Packet Access/cdma2000) devices, call processing while the device is roaming is handled through a network entity called Inter-working and Interoperability Function (IIF), such as those produced by Syniverse™. The IIF handles a CDMA-centric multi-mode device while it roams on an EDGE/HSPA network and an EDGE/HSPA-centric device while it is roaming on a cdma2000 network. An example of a network operator that uses EDGE/HSPA network is Vodaphone™. An example of a network operator that uses cdma2000 network is Verizon™.

A typical cellular network provides supplementary services (SS) to the end users or subscribers in addition to a main service, such as voice calling. Examples of supplementary services are call barring, call forwarding, advice of charge, call waiting, caller identification, unstructured supplementary service data, etc. In some networks, users invoke SS by pressing "*" on a keypad of their respective devices followed by a numeric code or other related information or both. These codes are referred to as Supplementary Service Codes (SSC) or Feature Codes. While wireless networks using the same core network usually use the same method for supplementary services, different core networks use different methods and provide different capabilities. For example, an ANSI-41-based 3GPP2 core network (such as cdma2000) and a GSM-MAP-based 3GPP core network (such as GSM/HSPA network) may use different SSC for different SS functionality, use a different transport mechanism within the network for such services or use a different call flow sequence for invoking supplementary services. Another exemplary difference is that status inquiry of an SS and results of an SS request are conveyed to an end user in text form in GSM/HSPA networks but not in CDMA2000 networks.

BRIEF DESCRIPTION OF THE DRAWINGS

Examples of embodiments will now be described in greater detail with reference to the accompanying drawings, in which.

DETAILED DESCRIPTION

Figure 1:
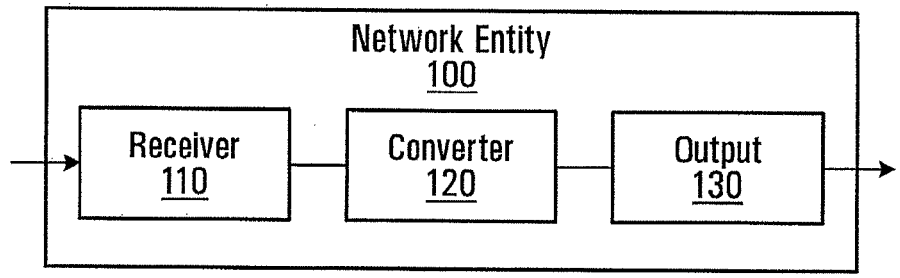
FIG. 1 is a block diagram of a network entity for providing supplementary services to a mobile device while roaming.

Supplementary services (SS) or features are provided in networks, such as cellular or WiFi networks. Non-limiting examples of SS are call waiting, caller identification, call forwarding, call barring, and advice of charge. At least three functionalities are associated with SS: enable SS; disable SS; and query SS.

In CDMA (Code Division Multiple Access) based networks, SS functionalities are invoked by sending a dialed string from the mobile device to an MSC (Mobile Switching Center). The dialed string identifies the associated SS. The MSC queries an HLR (Home Location Register) containing the user's subscription records to determine if the SS functionality can be performed and if yes, implements the functionality for the mobile device. In GSM/EDGE/UMTS/HSPA networks, SS functionalities are invoked using NAS (Non Access Stratum) signaling messages. The mobile device sends a "Register/facility" NAS message along with SS-specific code to an MSC, which queries an HLR to determine if the SS functionality can be performed, and sends a text notification of SS result/inquiry back to the mobile device.

Embodiments proposed herein enable users to take advantage of supplementary services offered by their home network while roaming in another network of different RAN/CN without any changes to the user interface associated with SS on the users' devices.

In a broad aspect, an SS invocation message embedded in a message using a transport protocol supported by the visiting network is received by a network entity. The network entity extracts the embedded invocation message and sends the invocation message to the home network using a protocol used by the home network for invocation of SS.

In another aspect, there is provided a network entity, the network entity comprising: a receiver for receiving a first message from a mobile device being provided roaming service by a first network, the first message being in a transport protocol supported by the first network and having embedded therein an invocation message for invocation of at least one supplementary service offered by a second network; a converter for extracting the invocation message from the first message; and an output for sending the invocation message to the second network using a protocol used by the second network to invoke the at least one supplementary service.

In another aspect, there is provided a method for providing supplementary services offered by a second network to a mobile device while the mobile device is roaming in a first network, the method comprising: receiving a first message from a mobile device being provided roaming service by the first network, the first message being in a transport protocol supported by the first network and having embedded therein an invocation message for invocation of at least one supplementary service offered by the second network; extracting the invocation message from the first message; and sending the invocation message to the second network using a protocol used by the second network to invoke the at least one supplementary service.

In another aspect, there is provided a system for providing one or more supplementary services offered by a second network to a mobile device while the mobile device is roaming in a first network, the system comprising the mobile device and a network entity, wherein: the mobile device comprises a user interface to receive input for invocation of at least one of the one or more supplementary services offered by the second network; a first converter for embedding an invocation message based on the input into a first message in a transport protocol supported by the first network; and a first output to send the first message to the network entity through the first network; and the network entity comprises a receiver for receiving the invocation message from the mobile device; a second converter for extracting the input from the first message; and a second output for sending the invocation message to the second network using a protocol used by the second network to invoke the at least one of the one or more supplementary services.

One embodiment of a network entity will now be described with reference to FIG. 1. The network entity 100 comprises a receiver 110, a converter 120 and an output 130.

The receiver 110 is for receiving a first message from a mobile device being provided roaming service by a first network. The first message is in a transport protocol supported by the first network and has embedded therein an invocation message for invocation of at least one supplementary service offered by a second network. For a mobile device roaming in a visited network, the visited network will be the first network and the home network for the mobile device will be the second network. In some embodiments, the first network and the second network have different core network infrastructures.

The converter 120 is for extracting the invocation message from the first message.

The output 130 is for sending the invocation message to the second network using a protocol used by the second network to invoke the at least one supplementary service.

In some embodiments, the transport protocol is a protocol supported by both the first network and the second network. In some embodiments, the transport protocol is short message service (SMS) protocol and the invocation message is encapsulated in an SMS message addressed to the network entity. In further embodiments, the SMS message has information in a header indicating that the SMS message contains an SS invocation message. In some embodiments, the receiver 110 is configured to detect the information in the header and forward the SMS message to the converter 120 to extract the invocation message from the SMS message. In other embodiments, the converter 120 detects the information in the header of the SMS message.

In still other embodiments, the transport protocol is a signaling message in a voice call and the invocation message is embedded in a DTMF (Dual Tone Multi-Frequency) message addressed to the network entity. For example, the mobile device initiates a voice call to the network entity 100 and sends the invocation message to the network entity 100 as a DTMF message over the voice channel. In this example, the receiver 110 of the network entity 100 receives the DTMF message over the voice channel and the converter 120 extracts the invocation message from the DTMF message. The output 130 then sends the invocation message to the second or home network in the protocol used by the second or home network for invocation of SS.

Other protocols by which the network entity 100 can receive the invocation message include, but are not limited to, a data protocol, such as TCP (Transmission Control Protocol), SCTP (Stream Control Transmission Protocol) or UDP (User Datagram Protocol).

In some networks, such as where the second network is a 3GPP network, such as GSM, the second network sends a reply to the invocation message. Thus, in some embodiments of the network entity 100, the receiver 110 is further configured to receive a reply from the second network in the protocol used by the second network for invocation of the at least one supplementary service. The converter 120 is further configured to embed the reply into a second message in the transport protocol. The output 130 is further configured to send the second message to the mobile device in the first network using the transport protocol. Thus, the reply is sent to the mobile device while it is roaming. In some embodiments of the mobile device, the mobile device is configured to receive the second message, extract the reply from the second message and output the reply to a user interface. In some embodiments, the reply is a text notification.

In some embodiments, the network entity 100 is used in the provision of SS to mobile devices from both the first and the second network while they are roaming in the other of the first and second networks. In such embodiments, the receiver 110 is further configured to receive a third message from a second mobile device being provided roaming services in the second network. The third message is in a transport protocol supported by the second network and has embedded therein a second invocation message based on input from a second user requesting invocation of at least one supplementary service offered by the first network. The converter 120 is further configured to extract the second invocation message from the third message and the output 130 is further configured to send the second invocation message to the first network using a protocol used by the first network for invocation of the at least one supplementary service offered by the first network.

In some embodiments, the first network is a 3GPP2-defined network such as a cdma2000 network and the second network is a 3GPP-defined network, such as GSM network. In other embodiments, the first network is 3GPP-defined network, such as a GSM network, and the second network is a 3GPP2-defined network, such as a cdma2000 based network. Examples of 3GPP2-defined network include, but are not limited to: cdmaOne; cdma2000 1x; and cdma2000 1xEV-DO (Evolution-Data Optimized). Examples of 3GPP-defined based networks include, but are not limited to: GSM/GPRS/EDGE; UMTS/HSPA; LTE. In some embodiments, the network entity 100 is configured as an Interworking and Interoperability Functionality (IIF). It is to be understood that the first network and the second network can be any type of network.

In embodiments of network entity 100, the receiver 110, the converter 120 and the output 130 can be implemented using software, hardware, firmware or combinations therefore.

A method for providing supplementary services offered by a second network to a mobile device while the mobile device is roaming in a first network will now be described with reference to FIG. 2. The method can be implemented by a network entity such as the network entity 100 described with reference to FIG. 1.

Figure 2:
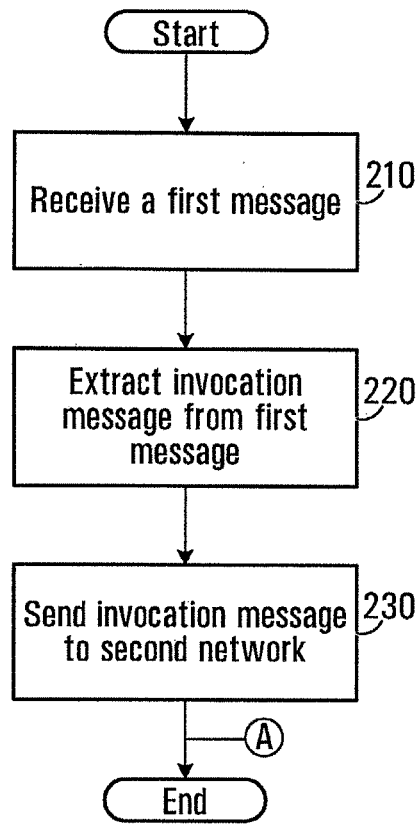
FIG. 2 is a flow chart of a method for providing supplementary services to a mobile device while roaming.

Now referring to FIG. 2, a method comprises at step 210, receiving a first message from a mobile device being provided roaming service by the first network, the first message being in a transport protocol supported by the first network and having embedded therein an invocation message based on input for invocation of at least one supplementary service offered by the second network. In the network entity 100, this step is performed by the receiver 110.

Next, at step 220, the method comprises extracting the embedded invocation message from the first message. Then at step 230, the method comprises sending the invocation message to the second network using a protocol used by the second network to invoke the at least one supplementary service.

As mentioned above, some networks send replies to SS invocation messages. Therefore, a further embodiment of the method will now be described with reference to FIG. 3. The steps of this further embodiment are implemented at point A after step 230 shown on FIG. 2. At step 240, the method further comprises receiving a reply from the second network in the protocol used by the second network to invoke the at least one supplementary service. Then at step 250, the reply is embedded into a second message in the transport protocol. At step 260, the second message is sent to the mobile device in the first network using the transport protocol.

Figure 4:
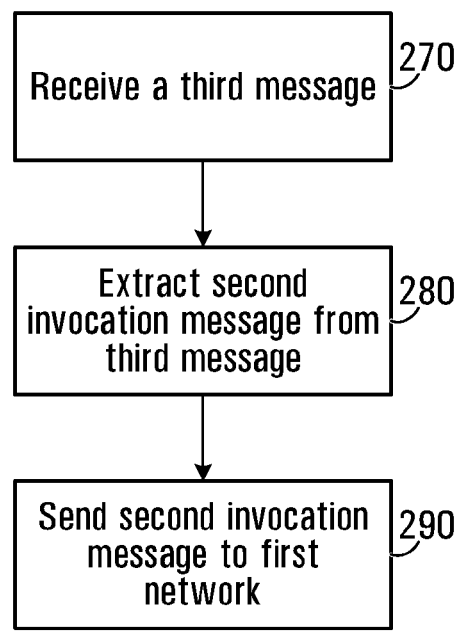
FIG. 4 is a flow chart of a method for providing supplementary services to a mobile device while roaming.

Referring to FIG. 4, in some embodiments, the method can also provide SS to a second mobile device while roaming in the second network. The steps of FIG. 4 are implemented at point A of the method described with reference to FIG. 2. The method, in this embodiment, further comprises a step 270 receiving a third message from a second mobile device being provided roaming services in the second network. As with the third message described with reference to FIG. 4, the message received at step 270 is in a transport protocol supported by the second network and has embedded therein a second invocation message for invocation of at least one supplementary service offered by the first network. Next, the method further comprises, at step 280, extracting the second invocation message from the third message. Then at step 290, the method further comprises sending the second invocation message to the first network using a protocol used by the first network for invocation of the at least one supplementary service offered by the first network.

Figure 3:
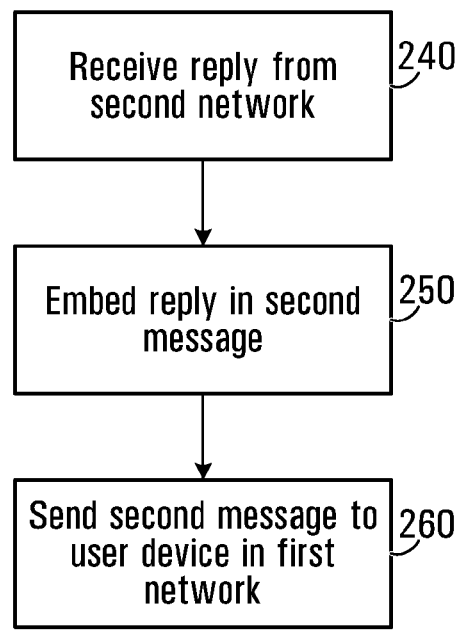
FIG. 3 is a flow chart of a method for providing supplementary services to a mobile device while roaming.

The methods described with reference to FIGS. 3 and 4 are not mutually exclusive of each other and can both be implemented concurrently in some embodiments. Likewise, both methods can be implemented by the same network entity, in some embodiments.

The methods described herein are implemented using hardware, firmware, software and/or any combinations thereof. They may be implemented on any network entity and in some embodiments they are implemented on an IIF operatively connectable to the first network and the second network.

Figure 5:
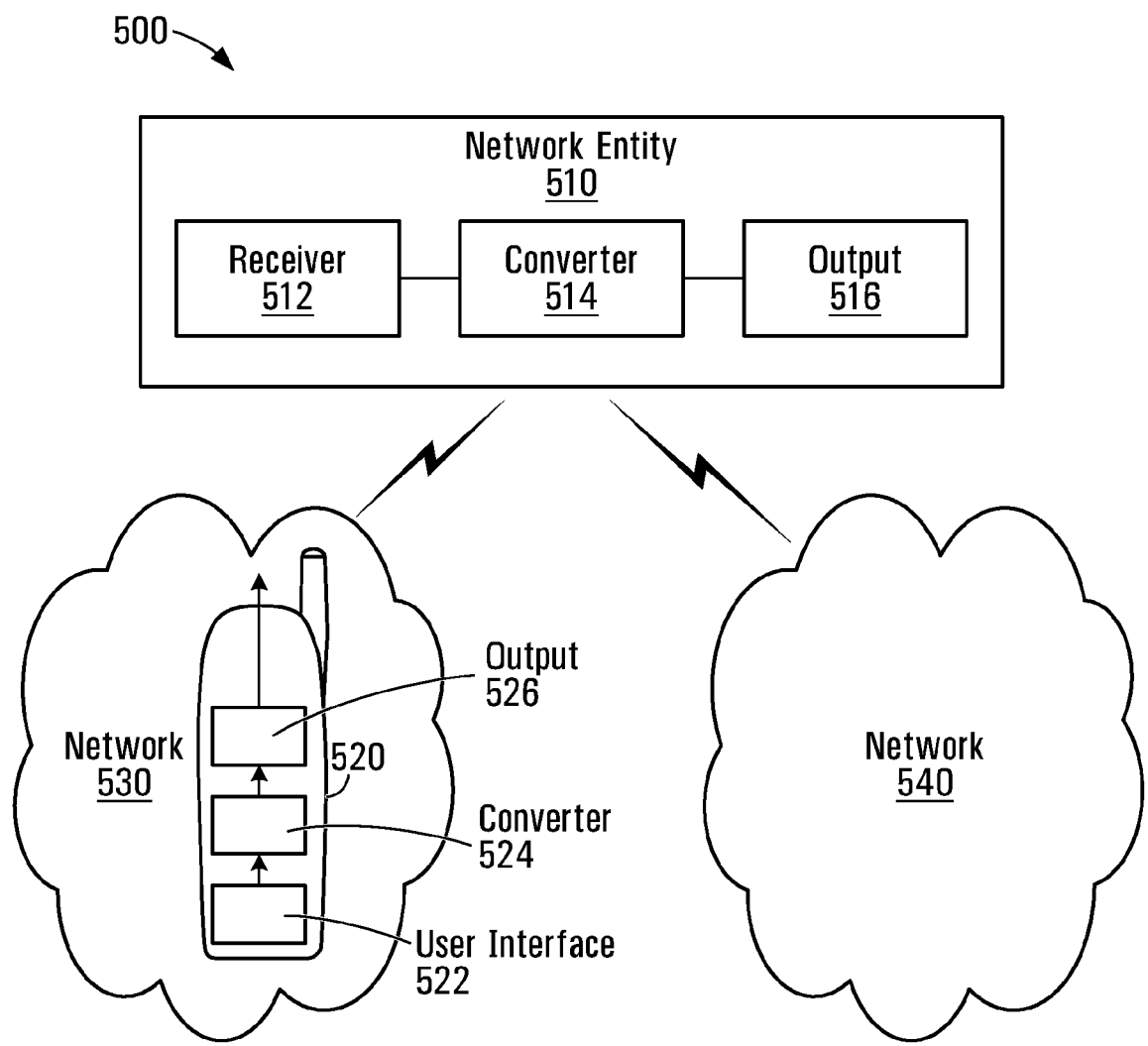
FIG. 5 is a schematic diagram of a system for providing supplementary services to a mobile device while roaming.

A system for providing one or more supplementary services offered by a second network to a mobile device while the mobile device is roaming in a first network will now be described with reference to FIG. 5. A system 500 comprises a network entity 510 and a mobile device 520. The mobile device 520 is shown roaming in a first network 530 and the network entity 510 is shown operatively connected to the first network 530 and a second network 540. The first network 530 and the second network 540 are shown for illustrative purposes only and do not form part of the system. In some embodiments the first network 530 is a visited network and the second network 540 is a home network for the mobile device 520.

While the system 500 is described with only one mobile device 520, it is to be understood that the system 500 can comprise any number of mobile devices. Likewise, the system 500 can comprise more than one network entity 510 and the network entity 510 can be connected to more than two networks.

The mobile device 520 comprises a user interface 522, a first converter 524 and a first output 526. The user interface 522 is configured to receive input for invocation of at least one of the one or more supplementary services offered by the second network 540. The first converter 524 is configured to embed an invocation message based on the input into a first message in a transport protocol supported by the first network 530. The first output 526 is configured to send the first message to the network entity 510 through the first network 530.

The network entity 510 is similar to the network entity 100 described with reference to FIG. 1 and comprises a receiver 512, a second converter 514 and a second output 516. The receiver 512 serves the same functions as the receiver 110 described with reference to FIG. 1 and is for receiving the invocation message from the mobile device 520. The second converter 514 serves the same functions as the converter 120 described with reference to FIG. 1 and is for extracting the input from the first message. The second output 516 serves the same functions as the output 130 described with reference to FIG. 1 and is for sending the invocation message to the second network 540 using a protocol used by the second network 540 to invoke the at least one supplementary service.

In further embodiments, the network entity 510 can be used in the provision of SS to mobile devices roaming in the first network 530 and mobile devices roaming in the second network 540.

In some embodiments, the converter 524 of mobile device 520 is configured to encapsulate the invocation message into an SMS message. The SMS message, in some embodiments, is addressed to the network entity 510. The second converter 514 of the network entity extracts the encapsulated invocation message from the SMS message.

In some networks, the call flow for SS requires that the network send a reply to the invocation message. Thus, in some embodiments of the system 500, the receiver 512 of the network entity 510 is further configured to receive a reply from the second network 540, the second converter 514 is configured to embed the reply in a second message and the second output 16 is configured to send the second message to the mobile device 520 in the first network. Furthermore, in some embodiments, the mobile device 520 further comprises a receiver (not shown) for receiving the second message and the converter 524 is further configured to extract the reply from the second message. In these embodiments, the mobile device 520 is further configured to process the reply. Once the reply is extracted from the second message by the mobile device 520, in some embodiments, the reply is processed in the same manner as a reply received while in the first network would be processed. In some embodiments, this involves outputting the reply using the user interface 522. In some embodiments, the user interface 522 comprises a display screen. In some embodiments the second message is an SMS message with the reply encapsulated therein.

In some embodiments, the messages sent between the network entity and any of the first network and second network are routed through a MSC (Mobile Switching Centre) in the respective network. In some embodiments, a HLR (Home Location Register) is maintained within the second network, which comprises a list of the location of mobile devices registered with the second network. The HLR is located on an MSC in some embodiments. In some embodiments, a VLR (Visiting Location Register) is maintained in the first network. The VLR comprises a list of mobile devices roaming within the first network. The VLR is located on an MSC in some embodiments.

In some embodiments of the system 500, the first network 530 is one of a 3GPP network and a 3GPP2 network and the second network 540 is the other of the 3GPP network and the 3GPP2 network.

Figure 6:
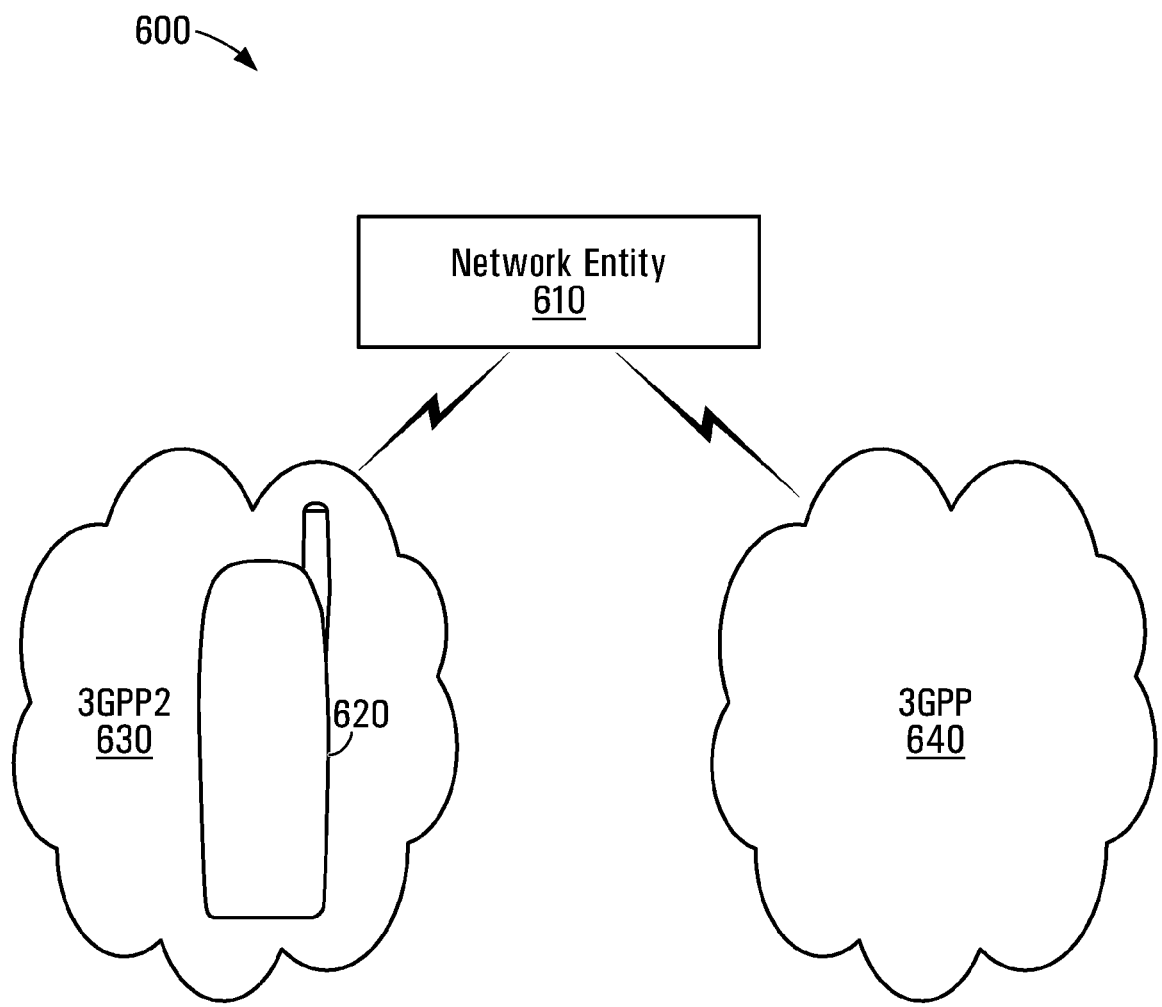
FIG. 6 is a schematic diagram of a system for providing supplementary services to a mobile device while roaming.

An exemplary system will now be described with reference to FIG. 6. The system 600 comprises a mobile device 620 and a network entity 610. The mobile device 620 is roaming in a 3GPP2 network 630 and has as its home network a 3GPP 640. The mobile device 620 is configured in a similar manner as the mobile device 520 described with reference to FIG. 5. The network entity 610 is operatively connectable to both the 3GPP2 network 630 and the 3GPP network 640 and is configured in a similar manner as the network entity 100 described with reference to FIG. 1 or the network entity 510 described with reference to FIG. 5.

Figure 7:
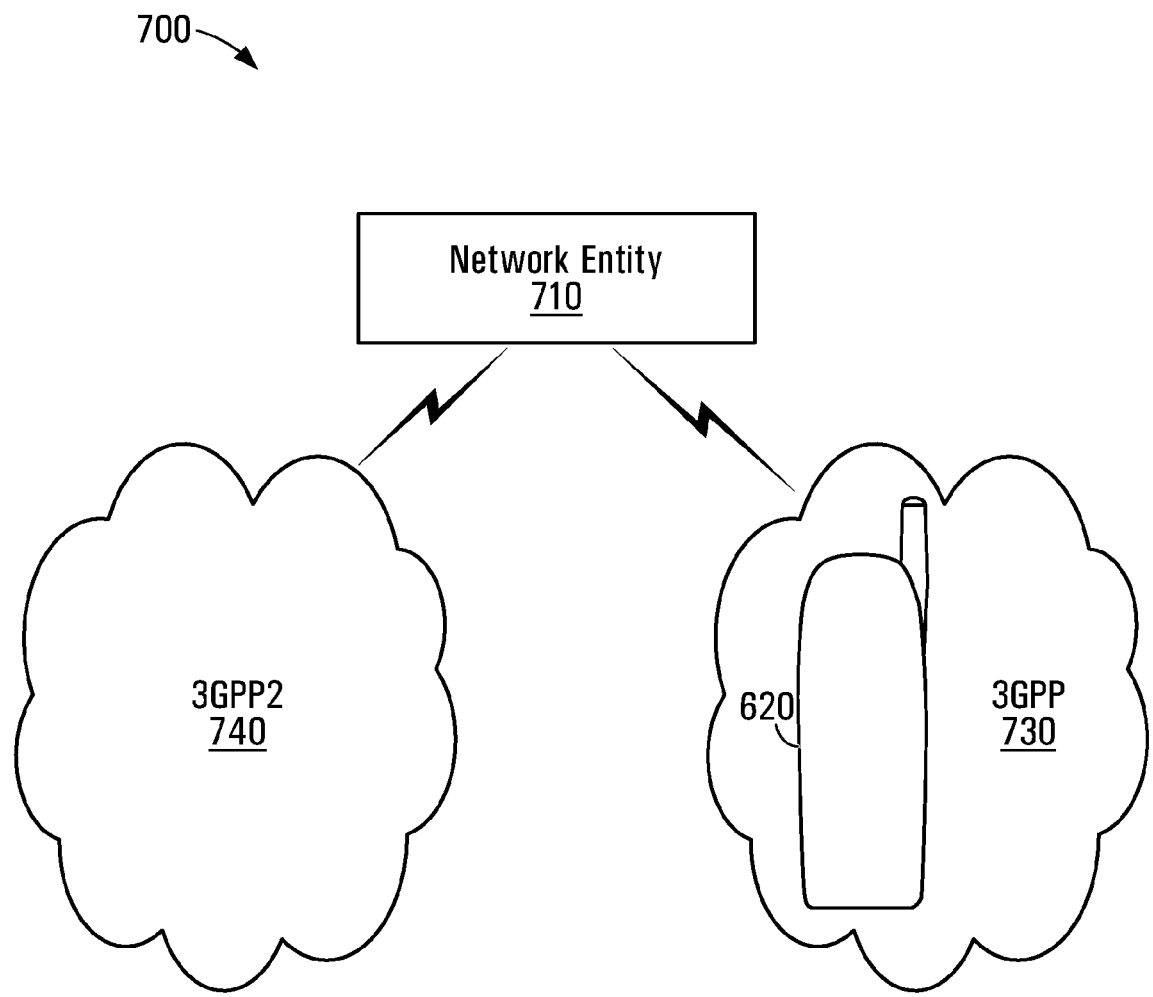
FIG. 7 is a schematic diagram of a system for providing supplementary services to a mobile device while roaming.

Another exemplary system will now be described with reference to FIG. 7. The system 700 comprises a mobile device 720 and a network entity 710. The mobile device 720 is roaming in a 3GPP network 730 and has as its home network a 3GPP2 network 740. The mobile device 720 is configured in a similar manner as the mobile device 520 described with reference to FIG. 5. The network entity 710 is operatively connectable to both the 3GPP2 network 740 and the 3GPP network 730 and is configured in a similar manner as the network entity 100 described with reference to FIG. 1 or the network entity 510 described with reference to FIG. 5.

Figure 8:
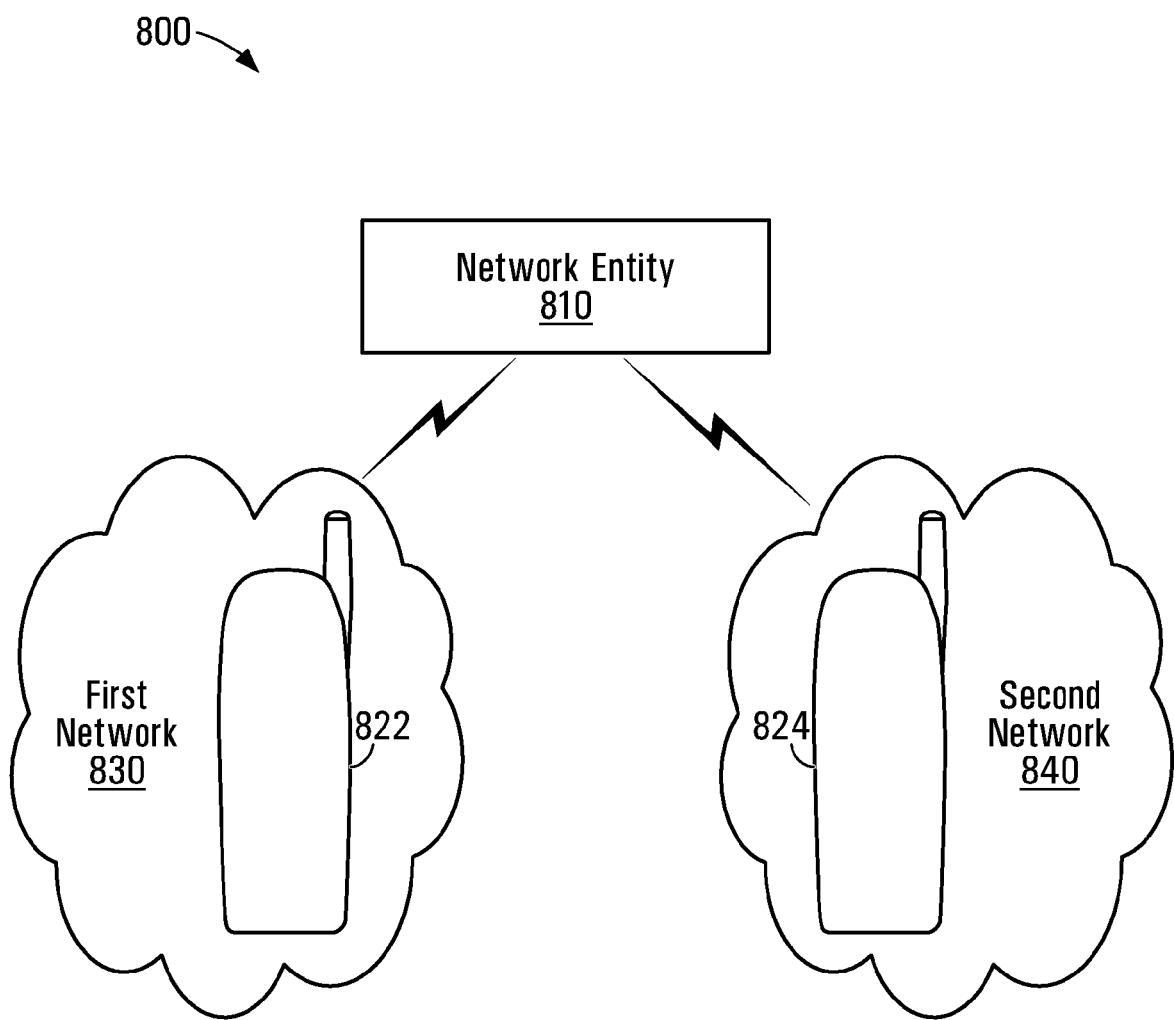
FIG. 8 is a schematic diagram of a system for providing supplementary services to a mobile device while roaming.

As mentioned above, in some embodiments, the network entities described herein are used in the provision of SS to mobile devices roaming in either of a first network and a second network. Referring to FIG. 8, an example of a system 800 where a network entity 810 is used to provide SS to a mobile device 822 roaming in a first network 830 and a second mobile device 824 roaming in a second network 840. The network entity 810 is configured in a similar manner as the network entity 100 described with reference to FIG. 1 or the network entity 510 described with reference to FIG. 5. The network entity 810 implements, for example, the method described with reference to FIGS. 2 and 4 in order to provide SS to both mobile devices 822 and 824. Of course, two mobile devices and two networks are used for illustrative purposes only and in other embodiments, any number of mobile devices and any number of networks are supportable.

Figure 9:
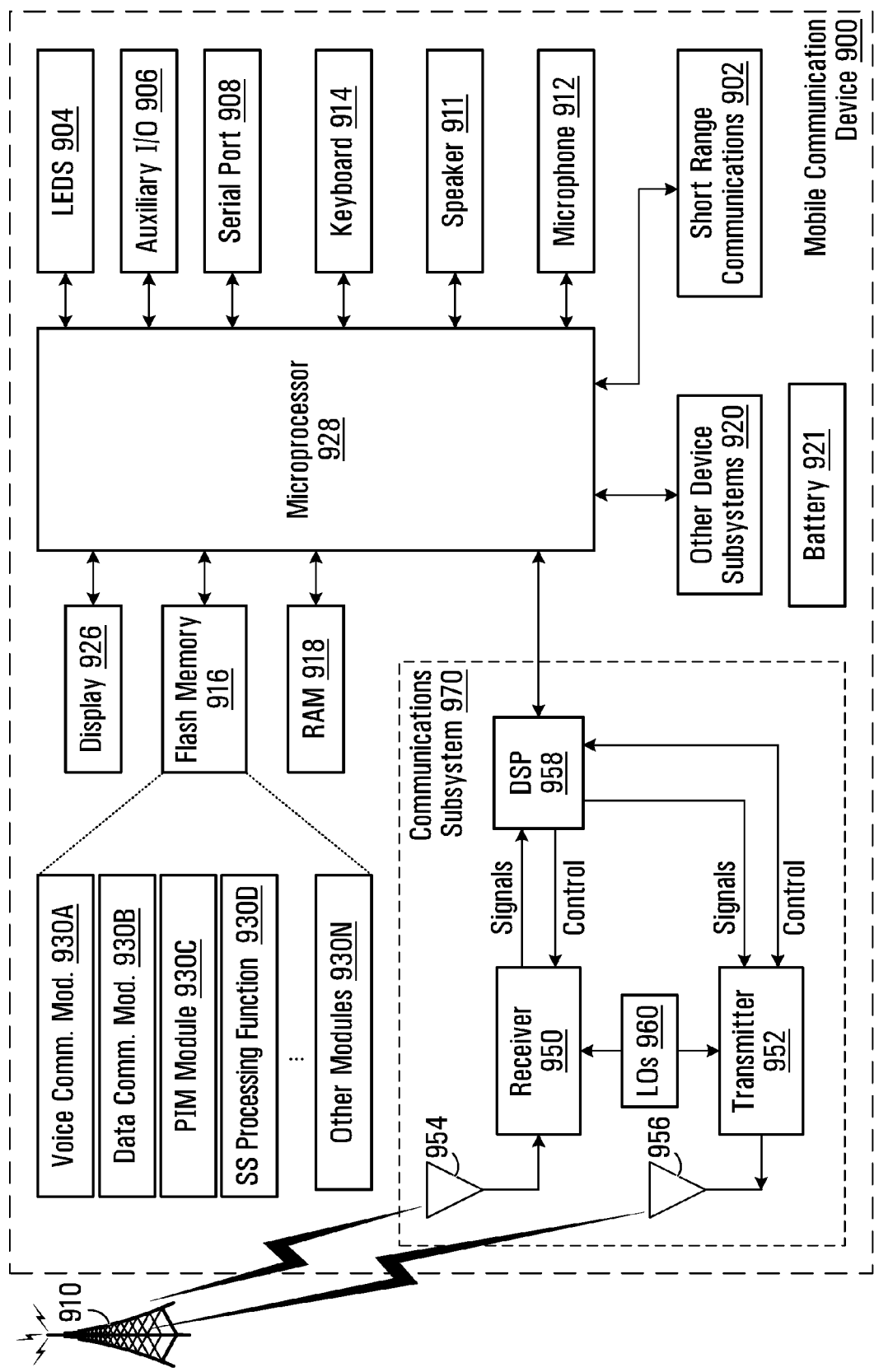
FIG. 9 is a block diagram of a mobile device on which the methods described herein may be executed.

FIG. 9 illustrates a hand-held mobile communication device 900 including a housing, an input device (a keyboard 914), and an output device (a display 926), which is in some embodiments a full graphic Liquid Crystal Display (LCD). Other types of output devices may alternatively be utilized. A processing device (a microprocessor 928) is shown schematically in FIG. 9 as coupled between the keyboard 914 and the display 926. The microprocessor 928 controls the operation of the display 926, as well as the overall operation of the mobile device 900, in response to actuation of keys on the keyboard 914 by a user.

The housing may be elongated vertically, or may take on other sizes and shapes (including clamshell housing structures). The keyboard 914 may include a mode selection key, or other hardware or software for switching between text entry and telephony entry.

In addition to the microprocessor 928, other parts of the mobile device 900 are shown schematically in FIG. 9. These include: a communications subsystem 970; a short-range communications subsystem 902; the keyboard 914 and the display 926, along with other input/output devices including a set of auxiliary I/O devices 906, a serial port 908, a speaker 911 and a microphone 912; as well as memory devices including a flash memory 916 and a Random Access Memory (RAM) 918; and various other device subsystems 920. The mobile device 900 may have a battery 921 to power the active elements of the mobile device 900. The mobile device 900 is in some embodiments a two-way radio frequency (RF) communication device having voice and data communication capabilities. In addition, the mobile device 900 in some embodiments has the capability to communicate with other computer systems via the Internet.

Operating system software executed by the microprocessor 928 is in some embodiments stored in a persistent store, such as the flash memory 916, but may be stored in other types of memory devices, such as a read only memory (ROM) or similar storage element. In addition, system software, specific device applications, or parts thereof, may be temporarily loaded into a volatile store, such as the RAM 918. Communication signals received by the mobile device may also be stored to the RAM 918.

The microprocessor 928, in addition to its operating system functions, enables execution of software applications on the mobile device 900. A predetermined set of software applications that control basic device operations, such as a voice communications module 930A and a data communications module 930B, may be installed on the mobile device 900 during manufacture. In addition, a personal information manager (PIM) application module 930C may also be installed on the mobile device 900 during manufacture. The PIM application is in some embodiments capable of organizing and managing data items, such as e-mail, calendar events, voice mails, appointments, and task items. The PIM application is also in some embodiments capable of sending and receiving data items via a wireless network 910. In some embodiments, the data items managed by the PIM application are seamlessly integrated, synchronized and updated via the wireless network 910 with the device user's corresponding data items stored or associated with a host computer system.

In addition, a software application to perform a SS processing function 930D may be installed.

As well, additional software modules, illustrated as other software modules 930N, may be installed during manufacture.

Communication functions, including data and voice communications, are performed through the communication subsystem 970, and possibly through the short-range communications subsystem 902. The communication subsystem 970 includes a receiver 950, a transmitter 952 and one or more antennas, illustrated as a receive antenna 954 and a transmit antenna 956. In addition, the communication subsystem 970 also includes a processing module, such as a digital signal processor (DSP) 958, and local oscillators (LOs) 960. The specific design and implementation of the communication subsystem 970 is dependent upon the communication network in which the mobile device 900 is intended to operate. For example, the communication subsystem 970 of the mobile device 900 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 900.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 900 may send and receive communication signals over the communication network 910. Signals received from the communication network 910 by the receive antenna 954 are routed to the receiver 950, which provides for signal amplification, frequency down conversion, filtering, channel selection, etc., and may also provide analog to digital conversion. Analog-to-digital conversion of the received signal allows the DSP 958 to perform more complex communication functions, such as demodulation and decoding. In a similar manner, signals to be transmitted to the network 910 are processed (e.g., modulated and encoded) by the DSP 958 and are then provided to the transmitter 952 for digital to analog conversion, frequency up conversion, filtering, amplification and transmission to the communication network 910 (or networks) via the transmit antenna 956.

In addition to processing communication signals, the DSP 958 provides for control of the receiver 950 and the transmitter 952. For example, gains applied to communication signals in the receiver 950 and the transmitter 952 may be adaptively controlled through automatic gain control algorithms implemented in the DSP 958.

In a data communication mode, a received signal, such as a text message or web page download, is processed by the communication subsystem 970 and is input to the microprocessor 928. The received signal is then further processed by the microprocessor 928 for an output to the display 926, or alternatively to some other auxiliary I/O devices 906. A device user may also compose data items, such as e-mail messages, using the keyboard 914 and/or some other auxiliary I/O device 906, such as a touchpad, a rocker switch, a thumb-wheel, or some other type of input device. The composed data items may then be transmitted over the communication network 910 via the communication subsystem 970.

In a voice communication mode, overall operation of the device is substantially similar to the data communication mode, except that received signals are output to a speaker 911, and signals for transmission are generated by a microphone 912. Alternative voice or audio I/O subsystems, such as a voice message recording subsystem, may also be implemented on the device 900. In addition, the display 926 may also be utilized in voice communication mode, for example, to display the identity of a calling party, the duration of a voice call, or other voice call related information.

The short-range communications subsystem 902 enables communication between the mobile device 900 and other proximate systems or devices, which need not necessarily be similar devices. For example, the short-range communications subsystem may include an infrared device and associated circuits and components, or a Bluetooth™ communication module to provide for communication with similarly-enabled systems and devices.

What has been described is merely illustrative of the application of the principles of methods, modules and devices described herein. Other arrangements and methods can be implemented by those skilled in the art without departing from the spirit and scope of the embodiments.

The invention claimed is:

1. A network entity comprising:
   a receiver for receiving a first message from a mobile device being provided roaming service by a first network, the first message being conformant to a protocol supported by the first network for invoking supplementary services and having embedded therein an invocation message for invocation of at least one supplementary service offered by a second network;
   a converter for extracting the invocation message from the first message; and
   an output for sending the invocation message to the second network using a protocol used by the second network to invoke the at least one supplementary service,
   wherein the invocation message is in a format usable by the mobile device for directly invoking the at least one supplementary service offered by the second network when the mobile device is being provided non-roaming service by the second network,
   wherein the at least one supplementary service offered by the second network supports at least the functions: enable supplementary service, disable supplementary service and query supplementary service,
   wherein invoking the at least one supplementary services comprises triggering any one of said functions,
   wherein the protocol supported by the first network for invoking supplementary services differs from the protocol used by the second network to invoke the at least one supplementary service,
   wherein the receiver is further configured to receive a reply from the second network in the protocol used by the second network for sending a response to a request for invocation of supplementary services,
   wherein the converter is further configured to embed the reply into a second message in a transport protocol supported by the first network; and
   wherein the output is further configured to send the second message to the mobile device in the first network using the transport protocol.

2. The network entity of claim 1, wherein the protocol supported by the first network for invoking supplementary services is short message service (SMS) protocol and the invocation message is encapsulated in an SMS message addressed to the network entity.

3. The network entity of claim 1, wherein the protocol supported by the first network for invoking supplementary services is a signaling message in a voice call and the invocation message is embedded in a DTMF (Dual Tone Multi-frequency) message addressed to the network entity.

4. The network entity of claim 1, wherein the protocol supported by the first network for invoking supplementary services is a data protocol.

5. The network entity of claim 1, wherein the first network is a 3GPP2 network and the second network is a 3GPP network.

6. The network entity of claim 1, wherein the first network is a 3GPP network and the second network is a 3GPP2 network.

7. The network entity of claim 1, wherein:
the receiver is further configured to receive an additional message from a second mobile device being provided roaming services in the second network, the additional message from the second mobile device being in a transport protocol supported by the second network and having embedded therein a second invocation message for invocation of at least one supplementary service offered by the first network;
the converter is further configured to extract the second invocation message from the additional message; and
the output is further configured to send the second invocation message to the first network using a protocol used by the first network for invocation of the at least one supplementary service offered by the first network.

8. The network entity of claim 1, configured as an Interworking and Interoperability Functionality (IIF).

9. The network entity of claim 1, wherein the at least one supplementary service is any one of: call forwarding; call waiting; call barring; caller identification; and advice of charge.

10. A method for providing supplementary services offered by a second network to a mobile device while the mobile device is roaming in a first network, the method comprising:
receiving a first message from a mobile device being provided roaming service by the first network, the first message being conformant to a protocol supported by the first network for invoking supplementary services and having embedded therein an invocation message for invocation of at least one supplementary service offered by the second network;
extracting the invocation message from the first message;
sending the invocation message to the second network using a protocol used by the second network to invoke the at least one supplementary service;
receiving a reply from the second network in the protocol used by the second network to send a response to a request to invoke the at least one supplementary service;
embedding the reply into a second message in a transport protocol supported by the first network; and
sending the second message to the mobile device in the first network using the transport protocol,
wherein the invocation message is in a format usable by the mobile device for directly invoking the at least one supplementary service offered by the second network when the mobile device is being provided non-roaming service by the second network,
wherein the at least one supplementary service offered by the second network supports at least the functions: enable supplementary service, disable supplementary service, and query supplementary service,
wherein invoking the at least one supplementary service comprises triggering any one of said functions, and
wherein the protocol supported by the first network for invoking supplementary services differs from the protocol used by the second network to invoke the at least one supplementary service.

11. The method of claim 10, wherein embedding the reply comprises encapsulating the reply in an SMS message.

12. The method of claim 11, further comprising adding information to the header of the SMS message indicating that the SMS message contains information related to supplementary services.

13. A system for providing one or more supplementary services offered by a second network to a mobile device while the mobile device is roaming in a first network, the system comprising the mobile device and a network entity, wherein:
the mobile device comprises:
a user interface to receive input for invocation of at least one of the one or more supplementary services offered by the second network;
a first converter for embedding an invocation message based on the input into a first message in a transport protocol supported by the first network; and
a first output to send the first message to the network entity through the first network; and
the network entity comprises:
a receiver for receiving the invocation message from the mobile device;
a second converter for extracting the input from the first message; and
a second output for sending the invocation message to the second network using a protocol used by the second network to invoke the at least one of the one or more supplementary services,
wherein:
the mobile device is configured to embed the invocation message into an SMS message;
the receiver of the network entity is further configured to receive a reply from the second network;
the second converter is configured to embed the reply in a second SMS message; and
the second output is configured to send the second SMS message to the mobile device in the first network;
and wherein:
the mobile device further comprises a receiver for receiving the second SMS message;
the first converter is further configured to extract the reply from the second SMS message; and
the mobile device is further configured to process the reply.

14. The system of claim 13, wherein the first network is one of a 3GPP network and a 3GPP2 network and the second network is the other of the 3GPP network and the 3GPP2 network.

15. The system of claim 13, wherein the network entity is configured as an Interworking and Interoperability Functionality (IIF).

16. The system of claim 13, wherein invocation of at least one of the one or more supplementary services comprises any one of: enable at least one supplementary service; disable at least one supplementary service; and query at least one supplementary service.

17. The system of claim 13, wherein invocation of at least one of the one or more supplementary services comprises invocation of any one of: call forwarding; call waiting; call barring; caller identification; and advice of charge.

* * * * *